United States Patent
Galantowicz et al.

[11] Patent Number: 5,975,111
[45] Date of Patent: Nov. 2, 1999

[54] WASTE TANK CLOG REMOVAL SYSTEM

[75] Inventors: Thomas J. Galantowicz, Bellevue; Eric J. Essman, Everett; Jon A. Feroy, Edgewood, all of Wash.

[73] Assignee: The Boeing Company, Seattle, Wash.

[21] Appl. No.: 08/939,131

[22] Filed: Sep. 29, 1997

[51] Int. Cl.⁶ .................... B08B 9/06; B08B 9/08
[52] U.S. Cl. .............. 137/239; 137/240; 137/899.2; 134/166 C; 134/166 R
[58] Field of Search ............... 134/166 R, 104.1, 134/169 R, 94.1, 103.1, 166 C; 137/239, 240, 565.17, 899, 625.42, 899.2, 625.46, 625.47; 210/108, 411, 798, 797; 4/108; 222/148

[56] References Cited

U.S. PATENT DOCUMENTS

| | | |
|---|---|---|
| Re. 32,750 | 9/1988 | Grills et al. . |
| 605,152 | 6/1898 | Twitchell ............................. 137/625.47 |
| 911,811 | 2/1909 | Dunning ............................. 137/625.47 |
| 982,671 | 12/1911 | Hardy ................................. 137/625.47 |
| 1,077,697 | 11/1913 | Gates ................................. 137/625.47 |
| 2,991,804 | 7/1961 | Merkle ............................... 137/625.47 |
| 3,581,895 | 6/1971 | Howard et al. ......................... 210/108 |
| 3,627,131 | 12/1971 | Goodman et al. ....................... 210/108 |
| 3,922,730 | 12/1975 | Kemper . |
| 4,153,552 | 5/1979 | Muther ................................. 210/108 |
| 4,187,175 | 2/1980 | Roberts et al. ......................... 210/108 |
| 4,214,324 | 7/1980 | Kemper et al. . |
| 4,275,470 | 6/1981 | Badger et al. . |
| 4,338,689 | 7/1982 | Zieg . |
| 4,357,719 | 11/1982 | Badger et al. . |
| 4,376,315 | 3/1983 | Badger et al. . |
| 4,521,925 | 6/1985 | Chen et al. . |
| 4,550,453 | 11/1985 | Norman .............................. 134/166 R |
| 4,783,859 | 11/1988 | Rozenblatt et al. . |
| 4,905,325 | 3/1990 | Colditz .............................. 134/166 R |
| 5,035,011 | 7/1991 | Rozenblatt et al. . |
| 5,232,010 | 8/1993 | Rozenblatt et al. . |
| 5,588,459 | 12/1996 | Ellis ..................................... 137/239 |
| 5,723,043 | 3/1998 | Hawk et al. ........................... 210/108 |

*Primary Examiner*—George L. Walton
*Attorney, Agent, or Firm*—Christensen O'Connor Johnson & Kindness

[57] ABSTRACT

A waste tank clog removal system is provided for removing clogs during draining of a waste tank through a drain line. This system removes the clog by flushing the clog back into the waste tank. A bypass valve and a hose assembly are added to an existing waste tank drain and rinse system. The hose assembly is connected to the bypass valve and routed to the drain line, between a ball valve and a drain valve. When clogging occurs, the bypass valve is rotated to a bypass position, the drain valve is closed, and rinse fluid fills the drain line to push the clog back into the waste tank.

2 Claims, 3 Drawing Sheets

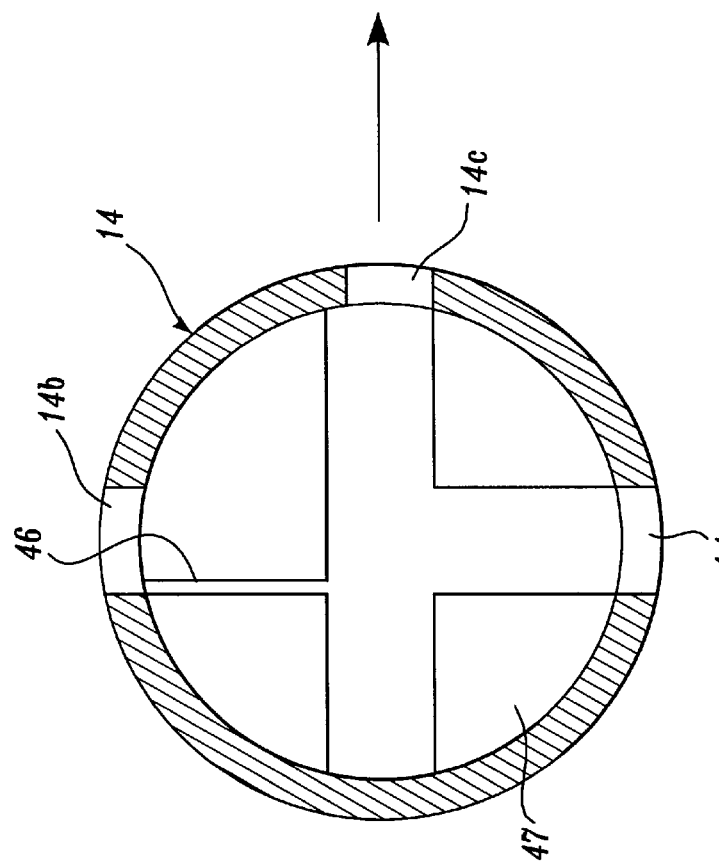
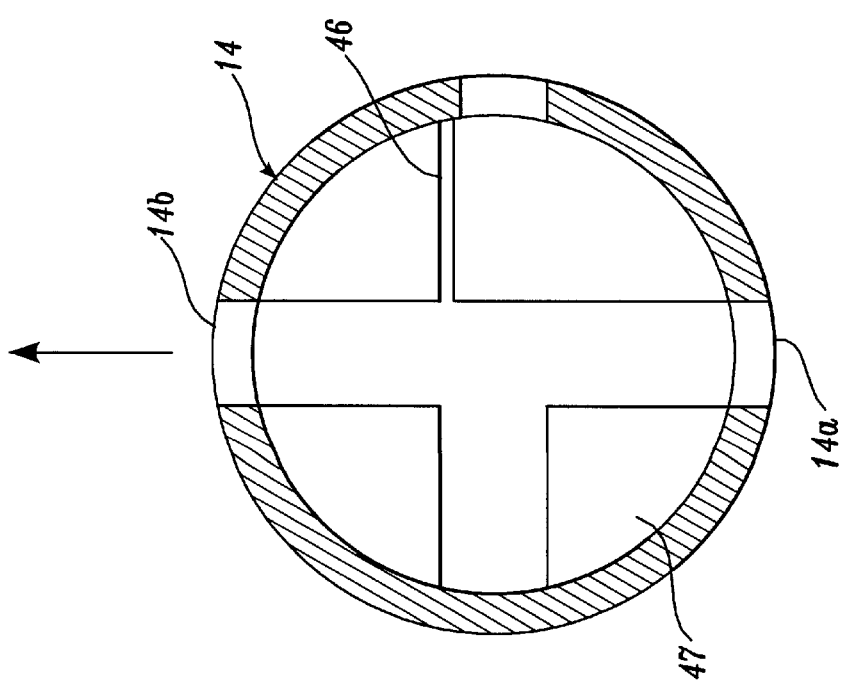

WASTE TANK CLOG REMOVAL SYSTEM

FIELD OF THE INVENTION

The present invention relates generally to clog removal systems and, more particularly, to removal of clogs when draining aircraft waste tanks.

BACKGROUND OF THE INVENTION

When draining an aircraft waste tank into a service truck waste tank, airlines often experience clogs. Diapers are often the cause of clogs that occur at the opening of a waste tank drain line between the aircraft waste tank and the service truck waste tank. Several tools are available to the airlines for removal of clogs.

One such tool is a Y-coupling. This tool connects to a drain valve between the aircraft waste tank drain line and a service truck drain line. The service truck drain line connects to the Y-coupling downstream. An auger is inserted into the Y portion of the coupling which is pushed back up the waste tank drain line until the clog is removed.

Another type of tool is a pneumatic tool that connects to the drain valve. With the drain valve open, pneumatic pressure is applied to push the clog back into the aircraft waste tank. Once the clog is removed, the tool is removed and the waste tank is allowed to drain.

A third type of tool used is a pneumatic tool that connects to a fitting on the waste tank drain line upstream from the drain valve. With the drain valve closed, pneumatic pressure is applied to push the clog back into the waste tank. Once the clog is removed, the tool is removed and the waste tank is allowed to drain.

The use of tools to remove clogs is very expensive for the airlines because of the various costs associated with it. The use of tools forces the airlines to have one tool at each base. In addition, the use of tools requires the airlines to rely on maintenance personnel to retrieve the tool, to remove the clog, and to sanitize the tool prior to storage. Furthermore, a risk of disease due to failure of the tool arises.

Another way to remove clogs involves opening up the aircraft waste tank and physically removing the clog. This method also creates potential hazards. Upon opening up the waste tank and removing the clog, waste material may spill into the cargo bay exposing personnel to raw sewage.

Accordingly, it is an object of this invention to provide a clog removal system in which the need for a tool is eliminated. The elimination of the need for a tool eliminates the costs and hazards associated with using a tool.

It is another object of this invention to provide a clog removal system that utilizes existing hardware on the airplane, including the rinse fitting and rinse fluid from the service truck rinse fluid tank, to remove clogs. By utilizing existing hardware, the costs are kept low. In addition, by utilizing the rinse fluid from the service truck rinse fluid tank to pressurize the waste tank drain line, the possibility of overpressurization is eliminated because service truck pressures will not exceed proof limits of the drain line and the existing hardware used.

SUMMARY OF THE INVENTION

A clog removal system for removing clogs that occur during draining of an airplane's waste tank utilizes an existing drain and rinse system, which includes a rinse fitting that connects to a rinse fluid tank on a service truck. Rinse fluid is pumped from the service truck rinse fluid tank through a rinse valve and a rinse filter and into rinse lines leading to rinse nozzles at the top of the airplane's waste tank. The rinse fluid passes through the waste tank and then through a waste tank drain line, which includes a ball valve. The rinse fluid then passes from the ball valve through a drain elbow that connects to a drain valve and coupling. The drain valve and coupling connect to a waste receiving tank on the service truck into which waste material and the rinse fluid are deposited.

This invention utilizes the existing drain and rinse system to remove clogs by adding a bypass valve in the rinse line downstream of the rinse filter. In addition, a hose assembly couples the bypass valve to a fitting on the drain elbow, just upstream of the drain valve. In the event of a clog, the bypass valve is rotated to divert the majority of the rinse fluid through the hose assembly to the drain elbow instead of the rinse nozzles. Prior to pumping the rinse fluid, an inner flapper in the drain valve is closed to avoid pumping the rinse fluid down the service truck drain line. Once the waste tank drain line is filled with rinse fluid, the pressure from the service truck, typically about 20–40 psi, will push the clog back into the airplane's waste tank. Once the clog is cleared, the bypass valve can be returned to a rinse position and conventional servicing can continue.

In accordance with a more detailed aspect of this invention, a vacuum breaker bleed port is added to the bypass valve to prevent siphoning of the rinse fluid from the airplane's waste tank back into the service truck rinse fluid tank once the clog is removed. A small amount of rinse fluid flows through the bleed port when flushing back clogs, allowing some rinse fluid to be pumped to the rinse nozzles. When pumping of the rinse fluid through the bypass ceases, a siphon cannot be formed through the bypass valve because the top of the siphon at the bypass valve is in fluid communication with the gas in the top of the tank.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 3A is a schematic diagram of the bypass valve in a rinse position; and

FIG. 3B is a schematic diagram of the bypass valve in a bypass position.

DETAILED DESCRIPTION OF THE INVENTION

Figure 1:
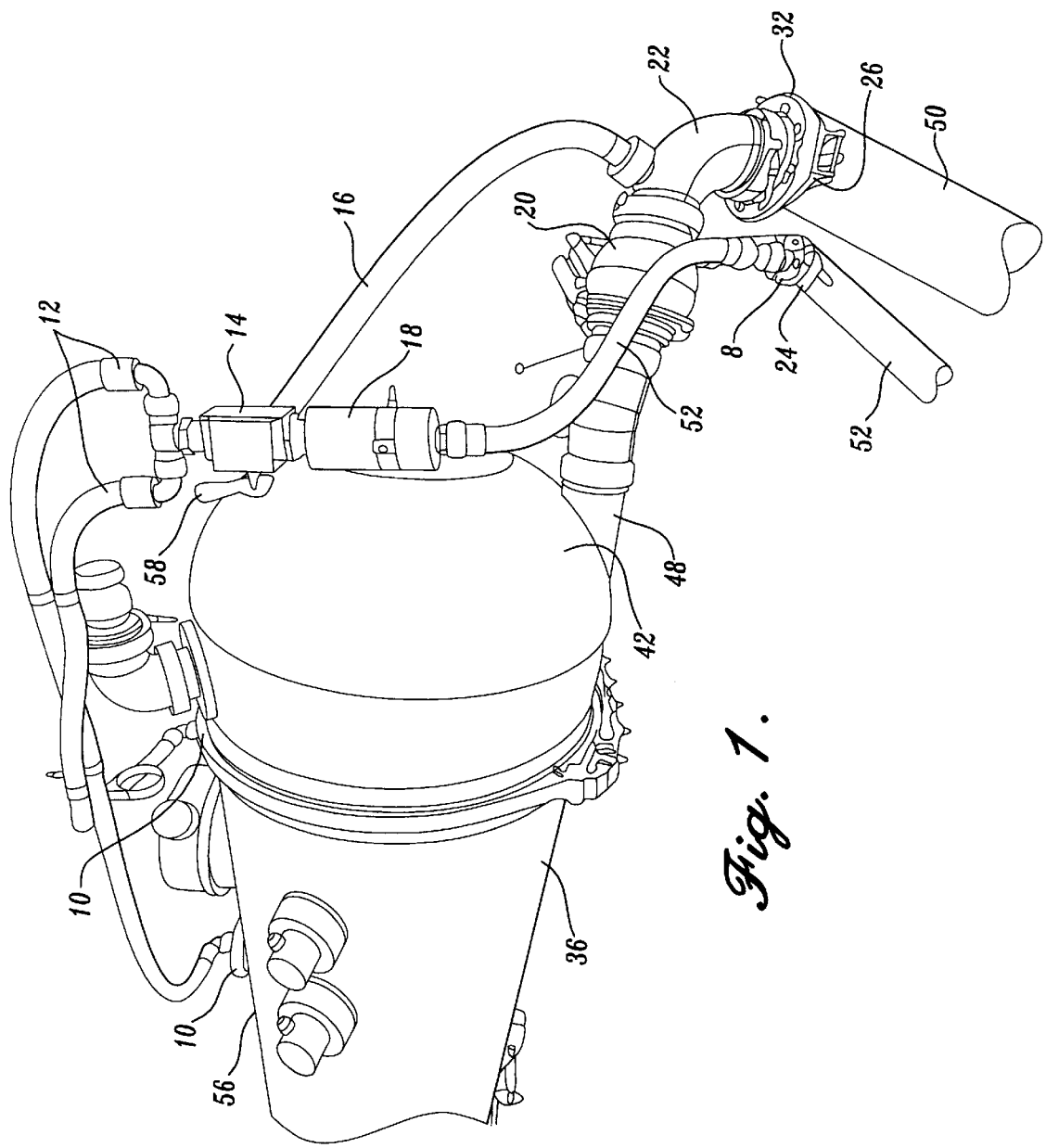
FIG. 1 is a perspective view of the invention, showing the bypass valve and hose assembly that are added to an existing waste tank drain and rinse system.
Figure 2:
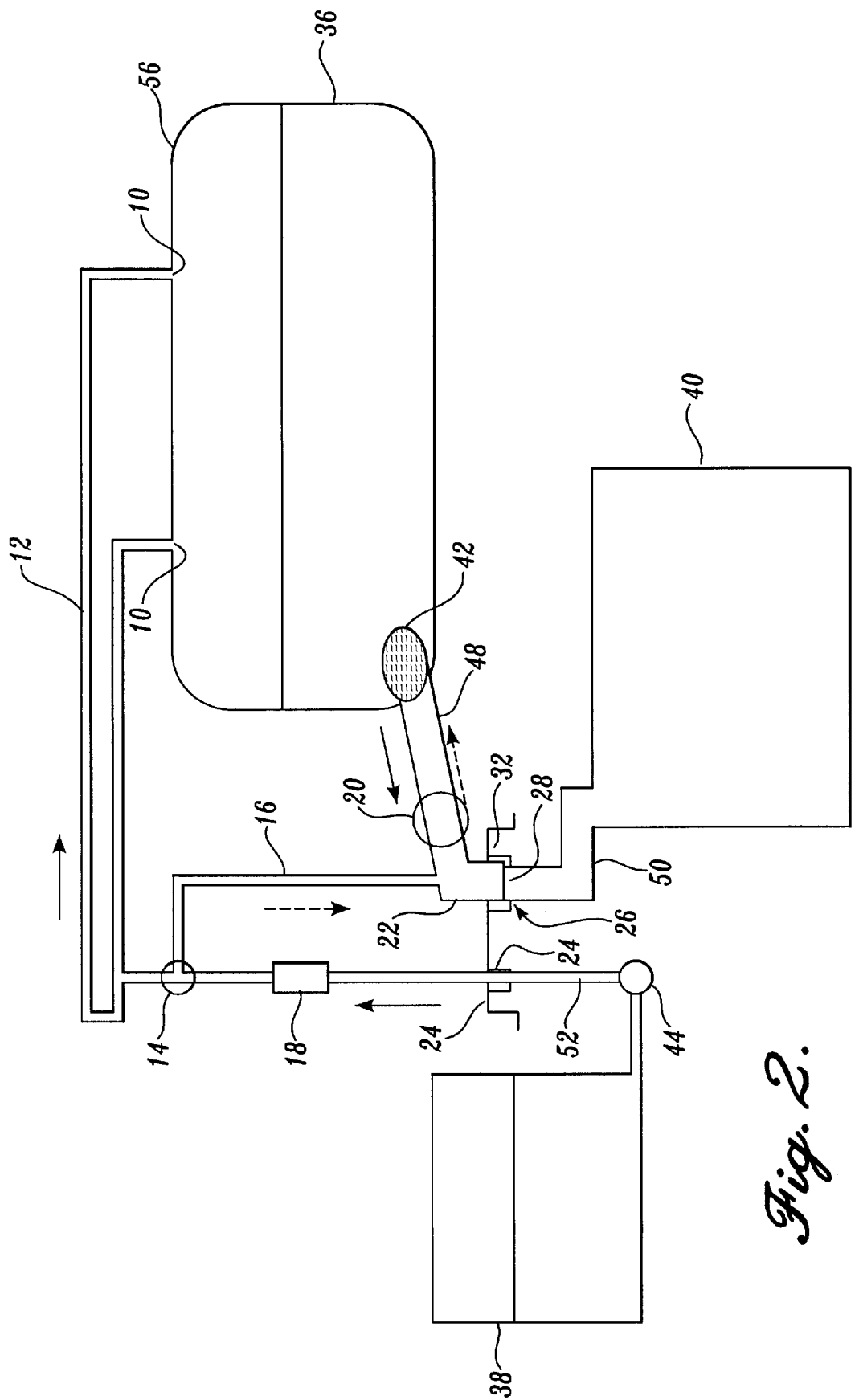
FIG. 2 is a schematic diagram of the added bypass valve and the added hose assembly in an existing waste tank drain and rinse system, in connection with a service truck rinse fluid tank and a service truck waste tank.

FIGS. 1 and 2 illustrate an existing waste tank drain and rinse system, modified by adding a bypass valve 14 and a hose assembly 16. During a typical servicing procedure, an outer cap (not shown) for a drain valve 26 is opened to expose the drain valve 26. A service truck drain line 50 is connected to the drain valve 26 through a drain fitting 32. A lever (not shown) opens an inner flapper 28 in the drain valve 26. The drain valve 26 is coupled to a drain elbow 22, which is in turn coupled to a ball valve 20. The ball valve 20 is then connected to the bottom of an airplane waste tank 36 by a drain line 48. The ball valve 20 is opened to allow the contents of the waste tank 36 to drain through the drain elbow 22, into the service truck drain line 50, and into a service truck waste tank 40 on a service truck (not shown). Once the waste tank 36 is empty, a rinse line 52 from a rinse fluid tank 38 on the service truck is connected to a rinse valve 8 by a rinse fitting 24. The rinse fitting 24 is coupled to spray nozzles 10 at the top side 56 of the waste tank by rinse line 12. A rinse filter 18 is interposed in the line 12 to trap particulate matter in the rinse fluid. A pump 44 on the service truck pumps rinse fluid through the rinse lines 12, and into rinse nozzles 10 in the waste tank 36. The flow of the rinse fluid during typical servicing is indicated by solid arrows in FIG. 2. The rinse fluid is sprayed throughout the tank to clean it. The rinse fluid exits the tank through the drain line 48. Once the waste tank 36 is cleaned, the ball valve 20 is closed.

FIGS. 1 and 2 also show the modifications made to the waste tank drain and rinse system. Particularly, the bypass valve 14 is interposed in the rinse lines 12 downstream of the rinse filter 18. The hose assembly 16 couples the bypass valve 14 to a fitting on the drain elbow 22, immediately upstream of the drain valve 26. When a clog 42 (such as a diaper) occurs between the waste tank 36 and the drain valve 26, a handle 58 on the bypass valve 14 is rotated to place the bypass valve 14 in a bypass position so that rinse fluid is diverted to the drain elbow 22 instead of to the rinse nozzles 10. The flow of the rinse fluid during clog removal is indicated by dotted arrows in FIG. 2. The rinse line to the nozzles is effectively blocked when the bypass valve 14 is in the bypass position. In addition, the inner flapper 28 in the drain valve 26 is closed to prevent pumping of the rinse fluid through the valve 26 and down to the service truck drain line 50. The rinse fluid from the service truck rinse fluid tank 38 is thus pumped into the waste tank drain line 48. Once the waste tank drain line 48 is filled with rinse fluid, the pressure from the rinse fluid pump 44 on the service truck, typically from 20–40 psi, will dislodge the clog 42 and force it back into the waste tank 36. Once the clog 42 is cleared, the bypass valve 14 can be returned to a rinse position, the flapper valve 28 opened, and servicing can be continued.

Referring to FIG. 3A, the bypass valve 14 is essentially a conventional two position valve with a slight modification. In FIG. 3A, the valve is shown in a rinse position so that fluid can flow through the valve spool 47 from inlet port 14*a* to outlet port 14*b*, thus coupling the rinse lines to the nozzles 10 in the waste tank. During clog removal, the valve spool 47 is rotated to a bypass position so that inlet port 14*a* is coupled to bypass port 14*c* through the valve spool, thus routing rinse fluid through the bypass line to the drain elbow 22.

Referring to FIG. 3B, the bypass valve 14 serves an additional function when in the bypass position. A vacuum breaker bleed port 46 is added to the spool of the bypass valve 14 to prevent siphoning of rinse fluid from the waste tank 36 back into the rinse fluid tank 38 and contaminating the rinse fluid tank 38, once the clog 42 is removed. When the bypass valve 14 is in the bypass position during clog removal, the bleed port in the valve spool 47 couples the outlet port 14*b* with both the inlet port 14*a* and the bypass port 14*c*. Because the bleed port is small relative to the other ports, little fluid flow occurs through the port, thus resulting in only a small pressure loss to the bypass port. This pressure drop is negligible for pushing back the clog 42, as testing has shown it takes approximately only 5 psi to push back the clog 42 into the waste tank 36. Also, because the bleed port is coupled to outlet port 14*b*, a siphon forms in the bypass line back through the upstream part of the rinse line and the siphon will be broken because the top of the siphon at the bypass valve is essentially coupled to atmospheric pressure through the downstream portion of the rinse line and the nozzles 10.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. In a clog removal system including a waste tank, a drain line coupled to the waste tank, an outlet valve movable between a closed position and an open position, coupled to the drain line, a rinse fluid supply line coupled to the waste tank for supplying a rinse fluid, the improvement comprising:

a bypass valve interposed in the rinse fluid supply line, said bypass valve movable between a rinse position that allows fluid to flow through the bypass valve to the waste tank for rinsing the tank such that the rinse fluid is then directed through an outlet of the tank through the drain line, and a bypass position that diverts rinse fluid from the rinse line to a bypass port; and a bypass line coupling the bypass port to the drain line to route the rinse fluid back through the drain line and into the tank when the bypass valve is in the bypass position; wherein during a clog at the outlet of the tank or in the drain line, the rinse fluid that is diverted through the bypass line forces rinse fluid back into the tank through the drain line thereby unclogging the system, and after said bypass valve is shutoff, the drain outlet valve is open for normal drain operation to allow the rinse fluid and waste to be drained through the drain outlet.

2. The system of claim 1, wherein the bypass valve includes an inlet port and an outlet port, said inlet and outlet ports being placed in fluid communication when said bypass valve is in the rinse position, said bypass valve further including a bleed port for coupling the inlet port to the outlet port and the bypass port when the bypass valve is in the bypass position so that a small amount of fluid may pass through said bleed port to said outlet port when said valve is in the bypass position.

* * * * *